Sept. 17, 1968 R. V. WHITE 3,401,712
LIQUID ADDITIVE APPARATUS OF AN ASPIRATING AND MIXING TYPE
Filed Sept. 11, 1964 2 Sheets-Sheet 1

INVENTOR.
REX V. WHITE

United States Patent Office 3,401,712
Patented Sept. 17, 1968

3,401,712
LIQUID ADDITIVE APPARATUS OF AN ASPIRATING AND MIXING TYPE
Rex V. White, 2048 S. La Cienega Blvd., Apt. 1, Los Angeles, Calif. 90034
Continuation-in-part of application Ser. No. 311,085, Sept. 24, 1963. This application Sept. 11, 1964, Ser. No. 395,863
13 Claims. (Cl. 137—101.27)

ABSTRACT OF THE DISCLOSURE

A liquid additive device including aspiration apparatus for mixing two liquids in a controllably adjustable ratio in a Venturi means composed of two concentric flow paths where the interior flow path is defined by a longitudinally movable tube. By moving the movable tube, the length of the concentric portion of the flow path, and hence the resistance to the aspiration, may be regulated.

---

This application is a continuation-in-part of my originally co-pending patent application for "Liquid Additive Apparatus," Ser. No. 311,085, filed Sept. 24, 1963, and subsequently issued as U.S. Patent No. 3,211,166.

Generally speaking, the present invention relates to liquid additive apparatus of an aspirating and mixing type adapted for use in adding a first liquid to a second liquid in a desired ratio and, more particularly, one preferred exemplary form of the invention pertains to chlorinating apparatus for adding a concentrated chlorine-containing liquid to a larger quantity of circulating swimming pool water in a desired ratio (which is preferably controllably adjustable) and also adapted to effectively mix said concentrated chlorine-containing liquid and said swimming pool water together whereby to effectively provide a desired concentration of chlorine in the swimming pool water for antiseptic purposes as is customary in swimming pool water. Incidentally, it should be noted that the chlorine containing liquid may be either directly added to the swimming pool water by recirculation of at least a portion of said swimming pool water from a swimming pool through the apparatus of the present invention and back to the swimming pool, or may be provided by adding and mixing the chlorine-containing liquid to an auxiliary supply of make-up water which is fed into the swimming pool for the purpose of maintaining the height of the top surface of the water in the swimming pool substantially at a predetermined level. Indeed, broadly speaking, the apparatus of the present invention may be used for adding one fluid to another flowing fluid in any desired ratio irrespective of whether in a closed-loop circuit or system or otherwise, although the invention is particularly suitable for such chlorinating of swimming pool water by either of the procedures mentioned above.

It should be clearly noted that the apparatus is not specifically limited to the above-mentioned specific preferred form of the invention, although it does comprise a highly effective form of the invention which provides a compact and self-contained type of chlorinator unit which can be readily connected in circuit (either directly in circuit or by way of make-up water added thereto, as mentioned above) with a much larger quantity of swimming pool water and which will be operable over a long period of time without maintenance or personal inspection being required and which will effectively maintain a required concentration of chlorine (or a pH controlling acidifying chemical or liquid, or any other desired additive material) in the swimming pool water in a manner which is greatly superior to, more effective and more uniform than, and much simpler as to size, complexity and cost of the apparatus required for doing same than, conventional prior art systems for chlorinating swimming pool water.

Therefore, the present invention will be described throughout this application primarily with reference to such a specific form thereof wherein it comprises chlorinating apparatus for swimming pool water. However, it is to be clearly understood that this is exemplary only and is to be construed in a non-limiting sense.

In connection with the above, it should be noted that various prior art chlorinating apparatuses and procedures have been invented and developed heretofore and are employed as conventional prior art equipment and practices. For example, various large mixing chambers wherein chlorine-containing liquid and water can be mixed (either power mixed or hand mixed) and then fed into the swimming pool water have been invented and developed heretofore and have been frequently employed in conventional prior art practice for this purpose. Also, in certain cases, chlorine-containing concentrate has been otherwise added to the swimming pool water by various different techniques and/or apparatuses. However, most of these prior art apparatuses and techniques have involved what might be called "batch type" processes wherein relatively large quantities of chlorine-containing concentrate are added to the swimming pool water at a particular time and then substantial periods of time elapse before the next such operation occurs. This results in causing too high a concentration of chlorine in the swimming pool water initially immediately after such an operation and too low a concentration of chlorine in the swimming pool water just before the next such chlorinating operation. In other words, such prior art techniques and apparatuses have all of the defects inherent in all such "batch type" operations as opposed to so-called "continuous flow" type operations.

Furthermore, most prior art apparatuses for the above-mentioned chlorinating purposes have been relatively large, costly, complex, and difficult to handle.

It should be clearly noted that the apparatus of the present invention is of what might be termed a "continuous flow" type since it is adapted to continually add the chlorine-containing concentrate in a desired and usually controllably adjustable ratio (which will be very precisely and accurately adjusted) with respect to the swimming pool water whenever said water is either being recirculated by a conventional pump or whenever additional pressurized make-up water is being fed into the main body of swimming pool water. This produces ideal sanitation conditions in the swimming pool water and actually minimizes the expense involved in chlorinating such swimming pool water.

Additionally, it should be noted that the apparatus of the present invention may be arranged to feed a desired metered quantity of pH modifying liquid (usually an acid solution) into the swimming pool water (either directly or by way of additional pressurized make-up water) so as to maintain the pH of the swimming pool water at an ideal value for sanitation purposes and for the minimization of the growth of algae and other undesirable organisms or plant life.

Furthermore, it should be noted that the apparatus of the present invention is of a very small, simple, easy-to-install, easy-to-operate, relatively inexpensive, virtually foolproof, construction which is self-operating over substantial periods of time and which will require little or no maintenance or inspection by the owner of a swimming pool, or swimming pool maintenance personnel, in the undesirable manner of certain types of prior art chlorinating apparatus and equipments.

With the above points in mind, it is an object of the present invention to provide novel fluid (usually liquid) additive apparatus of an aspirating and mixing type for adding a first fluid (usually liquid) to a second (usually liquid) in a desired ratio.

It is a further object of the present invention to provide additive apparatus of the character referred to in the preceding object, wherein said desired ratio is controllably adjustable in a very precise and accurate manner and wherein the apparatus also acts to effectively mix the two liquids together.

It is a further object of the present invention to provide liquid additive apparatus of the character referred to hereinbefore, which in one specific preferred form, comprises chlorinating apparatus for adding a chlorine-containing concentrate to a larger quantity of swimming pool water (either directly by addition to a recirculated quantity of said swimming pool water or by way of addition to new make-up water fed into and added to the main body of swimming pool water) in a desired ratio (which is usually controllably adjustable in a very precise and accurate manner) and for effectively mixing same together in what might be termed a "continuous flow" type of process which produces optimum sanitizing of the swimming pool water at minimum expense with respect to the chlorine-containing concentrate and also with respect to the apparatus involved.

It is a further object of the present invention to provide novel chlorinating apparatus of the character referred to hereinbefore, which in one preferred form thereof is arranged to become automatically operative in response to the operation of a conventional circulating main pump for the main body of swimming pool water and which is arranged to become inoperative in response to the deactivation or inactivation of said main swimming pool pump. In other words, in this preferred form of the invention, the chlorinating apparatus does not require any separate operating and/or control means and does not operate independently of the main swimming pool pump. This minimizes the cost and complexity of this form of the apparatus and, furthermore, makes it virtually maintenance-free since the main swimming pool pump is usually clock-controlled or timer-controlled or, in certain cases, might be liquid level-controlled or otherwise automatically controlled for operation either at various time cycles or as needed in accordance with the fall and rise of the level of the top surface of the swimming pool water in the swimming pool, and they will also control the operation of the novel chlorinating apparatus of the present invention, which is additionally provided with valving in one form thereof so arranged as to prevent the complete emptying of the chlorinating apparatus which might otherwise require that the main swimming pool water pump be primed before it can again be satisfactorily operated (except in those arrangements where the pump itself might be of a self-priming type).

It is a further object of the present invention to provide novel chlorinating apparatus of the character referred to hereinbefore which is arranged so as to be capable of adding the chlorine-containing concentrate to the circulating swimming pool water either on the inflow, suction or low pressure side or on the outflow or high pressure side of a conventional circulating main pump for the swimming pool water, or which is capable of adding any other desired additive liquid with respect to water or the like in substantially the same manner—that is, at either high pressure or low pressure portions of a hydraulic circuit connected to said large quantity of water or the like.

It is a further object of the present invention to provide apparatus of the character referred to hereinbefore wherein the combination of the two liquids to be mixed is provided by a novel type of aspiration means and a novel type of ratio-controlling means for effectively controlling in a very precise and accurate manner the ratio of the two liquids combined and mixed by the novel apparatus of the present invention.

It is a further object of the present invention to provide apparatus of the character set forth in the preceding object wherein the aspiration means effectively comprises a Venturi means of a controllably adjustable length and, therefore, also of a correspondingly controllably adjustable back friction with respect to the flow of one of said liquids to be mixed as it passes therethrough. In this form of the invention, the above-mentioned ratio-controlling means may include means for controllably adjusting the effective length of the restricted area Venturi of the aspiration means whereby to correspondingly adjust the effective back friction provided by said length thereof so as to very precisely and accurately control the amount of one of said liquids fed therethrough into the other of said liquids as it flows through said aspiration means.

It is a further object of the present invention to provide apparatus of the character referred to hereinbefore, embodying any or all of the features referred to hereinbefore, either generically or specifically, individually or in combination, and which is of relatively simple, inexpensive, easy-to-install, easy-to-operate construction capable of mass manufacture at relatively low cost and which requires a minimum of maintenance and supervision whereby to be conducive to widespread use thereof.

Further objects are implicit in the detailed description which follows hereinafter (which is to be considered as exemplary of, but not specifically limiting, the present invention), and said objects will be apparent to persons skilled in the art after a careful study of the detailed description which follows hereinafter.

For the purpose of clarifying the nature of the present invention, one exemplary embodiment of the invention is illustrated in the hereinbelow-described figures of the accompanying two drawing sheets and is described in detail hereinafter, together with certain very slight variations thereof shown in part in broken lines.

FIG. 1 is a reduced-size front perspective view of one exemplary embodiment of the apparatus of the present invention wherein it is shown as comprising a chlorinating apparatus for adding a chlorine-containing concentrate liquid to a pressurized flowing second liquid which may be either a recirculated quantity of main swimming pool water or additional or new make-up water adapted to be fed into the main quantity of such swimming pool water, or the like.

Generally speaking, the liquid additive apparatus of the present invention comprises first inflow means adapted to be supplied with an additive first liquid which is to be added to a pressurized flowing second liquid and further comprises second inflow means adapted to be supplied with said pressurized flowing second liquid, with both said first and second inflow means being provided with common outflow means connected thereto, and having aspiration means effectively connected in circuit with said first and second inflow means and said common outflow means for passing said pressurized flowing second liquid through said aspiration means to said common outflow means, and including an effective Venturi means in communication with said first inflow means for applying aspirating suction thereto for aspirating a desired quantity of said additive first liquid into said pressurized flowing second liquid and for subsequently mixing same prior to feeding same outwardly through said common outflow duct means to a desired receiver, such as the main body of swimming pool water in a swimming pool in one preferred specific form of the invention.

In the preferred form of the invention, the aspiration means is effectively provided with adjustable ratio-controlling means for controlling the ratio of said first liquid, such as a chlorine-containing concentrate liquid or the like, aspirated from said first inflow means through said Venturi means into the pressurized flowing second liquid, such as either make-up water for the main body of swimming pool water or a recirculated portion of said main body of swimming pool water in one preferred form of the invention.

In the exemplary form of the invention illustrated, the first inflow means broadly referred to above, is generally designated by the reference numeral 21 and is shown in one specific exemplary form wherein it comprises a first chamber means generally designated at 21A and one first inflow conduit portion designated by the reference numeral 21B which connects to one aspiration means, generally designated by the reference numeral 22. It should be noted that said first inflow means 21 also includes another first inflow conduit portion 21B' connected to a second aspiration means 22', which is substantially identical in construction to the first-mentioned aspiration means 22.

In the exemplary form of the invention illustrated, the common outflow means broadly referred to above is generally designated by the reference numeral 23 and includes a second chamber means generally designated at 23A into which the first-mentioned aspiration means 22 discharges the mixed first and second liquids and also includes an outflow conduit portion 23B.

The aspiration means 22' is provided downstream thereof with a common outflow means designated generally by the reference numeral 23', which merely comprises an outflow conduit or duct portion usually referred to herein as a common output conduit portion, 23B', a check valve 24' and a control valve 25'.

Figure 2:
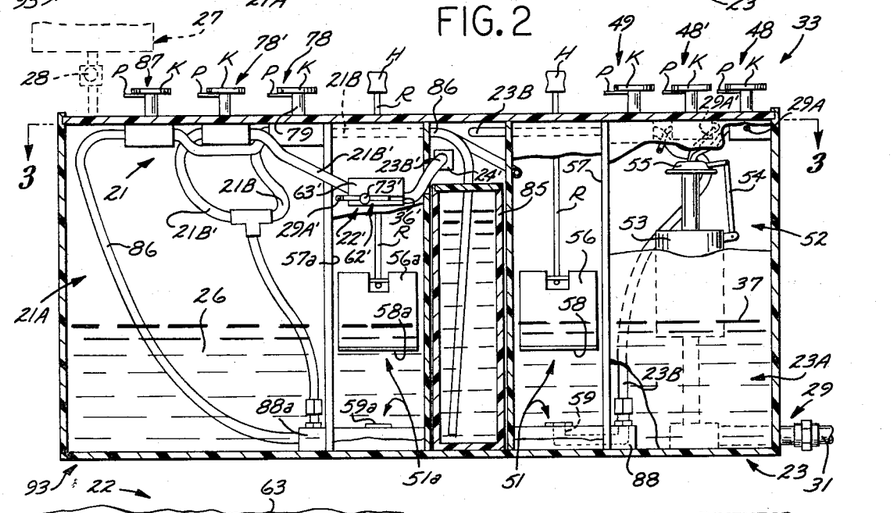
FIG. 2 is a fragmentary view, partly in section and partly in elevation, taken substantially along the plane indicated by the arrows 2—2 of FIG. 1.

The first inflow means, generally designated at 21, is adapted to be supplied with an additive first liquid, such as is designated by the reference numeral 26 in FIG. 2, and which may be a chlorine-containing concentrate liquid when the apparatus takes the form of a chlorinator, or which may be various other liquids in other forms of the invention. Incidentally, said liquid 26 may be fed into the first chamber 21A in any of a variety of ways. Said chamber 21A may be merely filled up to a desired upper level corresponding to a volume such as to allow the apparatus to operate for a relatively long period of time before refilling is required. On the other hand, an automatic feeder, such as is designated fragmentarily in broken lines at 27 in FIG. 2, may be employed for feeding such a chlorine-containing liquid through a controllably adjustable valve 28 into the chamber 21A, if desired, or various other means for supplying the first additive liquid 26 may be employed in lieu of those referred to above.

The second inflow means broadly referred to above is generally designated by the reference numeral 29 and comprises an input conduit, tube, or pipe 31, adapted to be supplied with a pressurized flowing second liquid, such as a quantity of make-up water, or the like. However, even when the apparatus is a chlorinator generally of the exemplary type illustrated, said second liquid may not comprise new make-up water but may comprise a recirculated portion of the main body of swimming pool water when the input to the chlorinator, generally designated at 33 in FIG. 8, follows the alternate optional broken line path, indicated at 34 in FIG. 8, rather than the solid line path indicated at 35 in FIG 8, which comprises an input connection from a water supply main or the like connected to the input pipe 31.

Said second inflow means generally designated at 29 also includes a second inflow conduit portion 29A which is connected to the first-mentioned aspiration means 22 and which is adapted to supply said pressurized flowing second liquid, which comes from the input pipe 31, to the interior of the first-mentioned aspiration means 22 whereby to suck a desired ratio of the first-mentioned liquid 26, comprising a chlorine-containing concentrate in the examplary form of the invention illustrated, into said flowing pressurized second liquid within the first-mentioned aspiration means 22 and to then effectively mix and discharge same through an outlet discharge opening 36 of said first-mentioned aspiration means 22 into said previously mentioned second chamber means 23A (comprising a part of the common outflow means generally designated at 23) which will contain the desired mixed first and second liquids, which are designated by the reference numeral 37, for subsequent discharge through the common output conduit portion 23B of said common outflow means generally designated at 23. It should be understood that said common output conduit portion 23B of said common outflow means 23 is adapted to be effectively connected to the input side of a main swimming pool water recirculating pump, such as is designated by the reference numeral 38 in FIG. 8, for subsequent pumping from the low pressure input side 39 thereof through the pump 38 and through the outlet or high pressure side 41 thereof, and then through the filter 42 and back through the return conduit means 43 into the swimming pool generally designated at 44 for subsequent withdrawal through outlets 45 and 46 and for suction back to the low pressure suction or input side 39 of said main swimming pool water circulation pump 38. In other words, make-up water is fed through the control valve 47 from a water supply main 35 to the input conduit or pipe 31 of the chlorinator 33 and then follows the outflow path of the common output conduit portion designated at 23B and comprising a part of the previously mentioned common outflow means generally designated at 23. It will be noted that this flow path contains two different controllably adjustable valve means generally designated at 48 and 49.

The control valve 58, which may be said to comprise both an on-and-off control valve and a controllably adjustable metering valve, may be employed for controlling the flow of said pressurized flowing second liquid comprising the input water fed through the input pipe 31 which is passed through the inflow conduit portion 29A to the first-mentioned aspiration means 22. The other control valve 49, which may be said to comprise both an on-and-off control valve and a controllably adjustable metering valve, may be employed for controlling the flow of the mixture of the first and second liquids 37 from the second chamber means 23A through an outlet-flow controlling float valve means generally designated at 51 to the common out conduit portion 23B of the common outflow means 23. Each of these valves 48 and 49 is of a type similar to that illustrated in FIG. 7 which is similarly connected in the inlet conduit portion 21B carrying the additive first chlorine-containing concentrate liquid 26 to the first-mentioned aspiration means 22, and said exemplary controllably adjustable metering valve means member is described in detail hereinafter, in connection with FIG. 7.

The inflow pipe 31 of the inflow means 29 is provided with an inflow controlling float valve means, generally designated at 52, and adapted to control the inflow of said pressurized water from the inflow pipe 31 to the first-mentioned aspiration means 22 in a manner such that whenever the mixed first and second liquids 37 in said second chamber means 23A rises to a predetermined upper maximum level, the float member 53 of said float valve means 52 moves the operating arm 54 thereof upwardly to a degree such as to close off the valve portion 55 thereof whereby to completely close all inflow of said pressurized second liquid through the inflow pipe 31 and conduit portion 29A to the first-mentioned aspiration means 22.

The previously mentioned outflow-controlling float valve means 51 is of different construction from the inflow controlling float valve means 52 is intended to be functionally quite similar but for outflow-controlling purposes with respect to the mixed liquids 37 in the chamber 23A. It will be noted that it comprises a buoyant float member 56 in a guide channel 57 and having a sealing lower surface 58 adapted to abut a valve opening 59 when in its lowermost position whereby to effectively seal off and close said valve opening 59 and prevent the flow of the mixed liquid 37 through said valve opening 59 and through the previously mentioned common output conduit portion 23B of the common outflow means 23. The detailed construction of said outflow-controlling float valve means 51 and the associated parts will be more readily understood from careful consideration of the very similar construction of the outflow controlling float valve means indicated generally at 51a as being carried by the first chamber means 21A, which is shown in considerable detail in FIG. 4 wherein corresponding parts of said float valve means, indicated generally at 51a, are indicated by reference numerals similar to those used for designating the elements of the first-mentioned float valve means 51, followed by the latter, a, however. Said outflow-controlling valve means 51 of the second chamber means 23A acts in a manner for the effective closure of the common outflow means 23, and the common output conduit or duct portion 23B connected to said second chamber means 23A thereof, in response ot the falling of the mixed first and second liquids 37 from said second chamber means 23A to a predetermined lower minimum top surface level thereof, and is also operable for the effective opening of said valve means 51 in response to the rising of the top surface level of said mixed liquids 37 above said predetermined lower minimum level thereof. This arrangement acts to prevent the level of the mixed liquids 37 from ever falling below the level of the valve opening 59 which might have the effect of causing the main swimming pool pump 38 shown in FIG. 8 to lose its prime. This is also true with respect to the previously mentioned outflow-controlling float valve means 51a of the first chamber means 21A, which acts to prevent the level of the chlorine-containing concentrate liquid 26 from ever falling below the level of the valve opening 59a which might let air get the conduit portion 21B whereby to affect the subsequent feed of said chlorine-containing concentrate liquid therethrough and which might undesirably affect the prime of said main swimming pool pump 38 shown in FIG. 8. The inflow controlling float valve 52 merely acts to feed incoming pressurized water through the inflow pipe 31 to the first-mentioned aspiration means 22 intermittently so that at all times the mixture of the first and second liquids, as designated at 37 in the second chamber means 23A, will lie either at a desired height or within a desired height range.

The first-mentioned aspiration means 22 is effectively provided with ratio-controlling means for controlling the ratio of the first chlorine-containing concentrate liquid 26 fed into the mixed with the pressurized flowing water supplied through the inflow pipe 31 and the inflow conduit portion 29A to the first aspiration means 22. Said ratio controlling means is generally designated by the reference numeral 62 and will be described in detail hereinafter. Said first-mentioned aspiration means 22 is exemplary of the second-mentioned aspiration means 22', and the detailed construction of only the first-mentioned one will, therefore, be described in detail at this point and should be considered as being applicable to the second-mentioned aspiration means 22' also. This is also true with respect to the ratio-controlling means generally designated at 62' of said second-mentioned aspiration means 22'. It should be noted that the various elements of the second-mentioned aspiration means 22' and of the associated ratio-controlling means 62' are indicated by numbers corresponding to those designating corresponding parts of the first-mentioned aspiration means 22 and the first-mentioned ratio-controlling means 62, primed, however.

With respect to said first-mentioned aspiration means 22, it should be noted that it comprises a body member 63 which includes a main flow passage or bore hole 64 formed therein and adapted to be relatively slidably connected in a sealed manner, as indicated at 65, to the inflow conduit portion 29A of the second inflow means indicated generally at 29. Said first-mentioned aspiration means 22 also has said first inflow conduit portion 21B of said first inflow means, generally designated at 21, connected thereto in a sealed manner, as indicated at 66, so as to be in communication with an upstream portion of said main flow passage 64.

It will be noted that said first-mentioned aspiration means 22 may be said to include an effective Venturi means, such as is generally designated at 67, which is formed by reason of the insertion of the forward nozzle end portion 68 of sad inlet conduit portion 29A within the larger area upstream Venturi portion 69 of the larger diameter main flow passage means 64, thus forming an effective Venturi flow passage 71, for said additive first liquid 26, of effectively reduced cross-sectional flow path area as compared with corresponding upstream and downstream effective cross-sectional flow path areas and being of controllably adjustable variable length, in a manner described more fully hereinafter, whereby to correspondingly provide controllably adjustable variable effective back friction opposing the passage of said additive first liquid 26 through the reduced-area annular effective Venturi flow passage 71 for effectively controlling the mount of said additive first liquid 26 which is sucked therethrough by the Venturi or aspirating action of the Venturi means 67 into the unobstructed forward portion of the main flow passage means 64. It will be noted that by merely inserting the nozzle 68 further into the main flow passage 64 the length of the restricted area effective Venturi flow passage 71 is increased and the above-mentioned back friction is correspondingly increased, which reduces the amount of additive first liquid, comprising the chlorine-containing concentrate liquid 26, which is added to the main stream of pressurized water coming from the inflow pipe 31 and through the nozzle 68. On the other hand, partially withdrawing the nozzle 68 will reduce said back friction and increase the amount of chlorine-containing concentrate liquid 26 mixed in with the main pressurized flowing water supplied from the input pipe 31.

Figure 6:
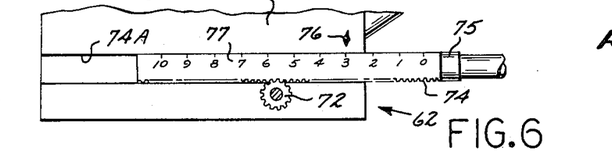
FIG. 6 is a fragmentary partly broken away view, partly in section and partly in elevation as indicated by the arrows 6—6 of FIG. 3, and illustrates one exemplary form of the controllably adjustable ratio-controlling means for controllably adjusting the length of the restricted-area Venturi portion, best shown in FIG. 5, whereby to provide a very precise and accurately controlled mixture of first and second liquids, such as a chlorine-containing concentrate and pressurized flowing water, for example.

The ratio-controlling means generally designated at 62 comprises a gear 72 provided with a manually rotatable knob 73 and rotatably mounted on the block member 63 and in engagement with a slidable toothed rack 74 which has its rear end firmly connected to a coupling member 75 carried by the slidably movable inlet conduit portion 29A behind the nozzle part 68 thereof. Thus, it will be understood that by merely rotating the knob 73 the toothed rack 74 can be caused to move longitudinally whereby to correspondingly move the nozzle 68 either inwardly or outwardly for ratio-controlling purposes. The setting can be repeated at any time by reason of the scale and index means comprising the index member 76 carried by the block 63 and the scale means 77 carried by the rack 74. It should be noted that the rack 74 may be carried by a bifurcated slide member adapted to engage grooved slide receivers 74A in opposite surfaces of the block 63 or may be otherwise slidably mounted in a functionally equivalent manner. Various other means for adjusting the ratio-controlling means 62 may also be employed.

It should be noted that the previously mentioned second inflow means, generally designated at 29, also includes an additional inflow conduit portion 29A' connected in parallel with respect to and substantially functionally equivalent to previously described inflow conduit portion 29A of said second inflow means 29. Also, said additional inflow conduit portion 29A' is provided with a controllably adjustable metering valve means 48' generally similar to the previously described controllably adjustable metering valve means 48. Also, said inflow conduit portion 29A' is connected to the previously mentioned second aspirating means 22' in a manner similar to the connection of the inflow conduit portion 29A to the first-mentioned aspiration means 22 as illustrated in detail in FIG. 5 and as previously described in detail. Therefore, none of said just mentioned elements will again be described since they are substantial duplicates of the corresponding previously described elements.

Figures 3, 4, 5:
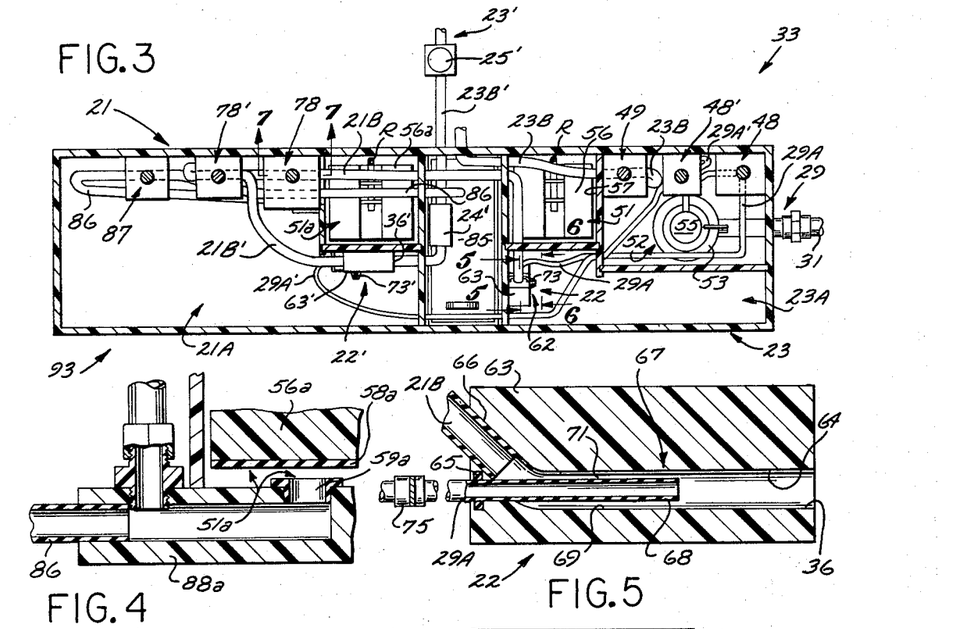
FIG. 3 is a slightly smaller scale top view taken along the plane indicated by the arrows 3—3 of FIG. 2 and shows certain portions of the apparatus in cross section and certain portions of the apparatus in full or partial top plan elevation.
FIG. 4 is an enlarged fragmentary sectional view, taken in the direction of the arrows 4—4 of FIG. 1 and illustrates a typical one of the two similar outflow-controlling float valve means and associated parts, and it should be understood that while this one is the one controlling outflow from the first chamber means, the other one controlling outflow from the second chamber means is substantially identical and, therefore, is not similarly shown in section.
FIG. 5 is an enlarged fragmentary view taken along the plane indicated by the arrows 5—5 of FIG. 3 and shows the interior construction of a typical one of the two different aspiration means of the exemplary form of the invention. It should be clearly understood that the other aspiration means is of similar interior construction and, therefore, is not shown in a similar cross section.

The previously mentioned first inflow means, generally designated at 21, also includes an additional inflow conduit portion 21B' functionally similar to and connected in parallel with respect to the previously described first inlet conduit portion 21B and has its outlet end connected to the previously referred to second-mentioned aspiration means 22' in a manner similar to the connection of the corresponding previously described first outlet conduit portion 21B with respect to the first-mentioned aspiration means 22 as shown in detail in FIG. 5 and as previously described in detail herein. Each of said alternate parallel first inflow conduit portions 21B and 21B' has a controllably adjustable metering valve means connected in circuit therewith as generally designated at 78 and 78', respectively, and each of said valves is of the same type of construction as the previously referred to control and metering valve means 48, 48' and 49. Therefore, all of said controllably adjustable metering valve means will be considered as having been adequately described by the specific description hereinafter of the one of them generally designated at 78 and illustrated in detail in FIG. 7. This is also true of the controllably adjustable metering valve means 87 which will be referred to hereinafter. Since all of said elements are substantially equivalent to the previously described corresponding elements, they will not be again described at this point, and it will be noted that the second-mentioned aspiration means 22' is connected to the second-mentioned common outflow means 23', and the common output conduit portion 23B' thereof, in parallel with respect to and similarly with respect to the connection of the first-mentioned aspiration means 22 (by way of the second chamber means 23A) to the corresponding common outflow means generally designated at 23 and the common output conduit or duct portion 23B thereof.

Normally, the valves 48' and 78' would be closed and the valves 48 and 78 would be controllably open to any desired degree when the apparatus is to be connected by way of the common output conduit portion 23B to the inflow side 39 of the main swimming pool water circulation pump 38. This comprises the arrangement for feeding a desired ratio of make-up water and chlorine-containing concentrate liquid 26 to said inlet side 39 of said main swimming pool pump 38, and the ratio of the mixed liquids 37 fed thereto can be controlled very precisely and accurately by adjusting the ratio-controlling means 62 illustrated in detail in FIG. 6. Also, the metering valve 48 and, in some cases, the metering valve 78 can be considered to be an additional part of said ratio-controlling means and may provide additional adjustment thereof to meet virtually any desired conditions of operation.

However, when the chlorinator 33 is to be connected primarily to the outflow or high pressure side 41 of the main swimming pool water recirculating pump 38, normally speaking, the valves 78 and 48 will be closed and the valve 78' and 48' will be controllably opened to any desired degree, thus causing the aspiration operation to be effected primarily by the second-mentioned aspiration means 22' which feeds the mixed first and second liquids through the check valve means 24' (to prevent undesired reverse or back flow) and the controllably openable and closable valve means 25' of the common output conduit portion 23B' of the common outflow means 23' to said high pressure or outlet side 41 of said pump 38. This is clearly shown in FIG. 8. It should also be noted that under certain conditions of use, both of said aspiration systems may be employed in various desired ratios with respect to each other.

Figure 7:
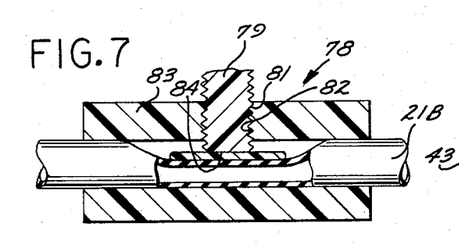
FIG. 7 is an enlarged fragmentary sectional view taken in the direction of the arrows 7—7 of FIG. 3 and illustrates a typical one of the plurality of controllably adjustable valve means comprising another portion of the above-mentioned ratio-controlling means.

The typical controllably adjustable metering valve means 78 illustrated in detail in FIG. 7 includes an arrangement wherein the conduit portion 21B is of a flexible type, such as plastic tubing or the like, and the valve means 78 actually comprises a manually rotatable valve member 79 having an exteriorly threaded lower portion 81 threadedly engaging an interiorly threaded portion 82 of the member 83 whereby rotation of the valve member 79 will cause the lower flat abutting end member 84 to either advance or retract with respect to the rest of the undeflected flexible first inflow conduit portion 21B in the manner best shown in FIG. 7. When it is advanced downwardly, it effectively reduces the interior cross-sectional area of the flexible conduit portion 21B to any desired degree and may, in fact, completely close said conduit portion 21B, if desired. On the other hand, threaded upward movement of the valve member 79 releases the compression from the flexible conduit portion 21B and allows it to open up and effectively increase its interior cross-sectional area to the full maximum as determined by the position of the rotary valve member 79.

It should be noted that the controllably adjustable metering valve means 78' has parts thereof corresponding to the controllably adjustable metering valve means 78 designated by corresponding reference numerals, primed, however. This is also true with respect to the controllably adjustable metering valve means 48, 48', 49 and 87 wherein parts which correspond to those of the controllably adjustable metering valve means 78 shown in detail in FIG. 7 are designated by similar reference numerals followed by the letter, a, in the case of the valve 48, the letter, b, in the case of the valve 48', the letter, c, in the case of the valve 49, and the letter, d, in the case of the valve 87. Incidentally, it should be noted that while all of said controllably adjustable metering valve means just referred to are shown as being of the same type as the one designated by the reference numeral 78 and illustrated in detail in FIG. 7, the invention is not specifically so limited in all forms thereof. The type of valve shown at 78 in FIG. 7 is particularly advantageous where the chlorine-containing concentrate liquid 26 is to be fed therethrough in undiluted form prior to combination with the rest of the main pressurized flowing water entering the chlorinator 33 through the input pipe 31. Only two of the said control valves, the one shown at 78 and the one shown at 78', are so positioned, and it is highly advantageous that they be of the type shown in FIG. 7 since such a controllably adjustable metering valve means is on a non-corrodible type having no moving valve parts exposed to the chlorine-containing concentrate liquid 26 and further since such a valve acts to minimize the tentency for "salting out" or deposition of any of the salts or other constituents of said liquid 26 in solution or in suspension therein which normally tends to occur at points of flow restriction to a degree such as to gradually build up and ultimately completely close such a restricted opening. This is true of nearly all prior art valved arrangements and is very much less true of the novel valves indicated at 78 and 78' since the first inflow conduit portion 21B or 21B', respectively, are flexible and minimize the tendency for any such "salting out" or deposition of chemicals. In view of the fact that none of the other of said controllably adjustable metering valve means referred to above is subjected directly to the undiluted chlorine-containing concentrate liquid 26, they may, if desired, be modified so as to comprise any other suitable valve means, although the type of valve means illustrated in FIG. 7 provides a very simple and highly advantageous type of controllably adjustable metering valve means which may also be said to comprise on-off valve means.

It should also be noted that a container 85 is provided for carrying a suitable acidifying chemical (not shown) which can be fed through a conduit portion 86 and another controllably adjustable metering valve means 87 (identical in all respects to the one designated at 78 in FIG. 7 and previously described in detail) and then through the end of the conduit portion 86 into a fitting 88a and through the previously mentioned first inflow conduit portion 21B to the first-mentioned aspiration means 22 if the valve means 78 is open (and valve 78' is closed) or to the second-mentioned aspiration means 22' if the valve 78 is closed and the valve 78' is open, or to both of said aspiration means in any desired ratio in correspondence with the ratio of the degree of opening of said valves 78 and 78'. FIG. 4 clearly illustrates this feature of the invention for acidifying the swimming pool water to provide proper pH control thereof for minimizing the tendency of organisms and plant life, such as algae or the like, to grow in swimming pool water and contaminate same. The control of acidity in conjunction with the control of chlorine concentration provides the most effective means for optimizing the sanitation aspects of the swimming pool water, and this feature of the invention provides for such.

It should be noted that the conduit portion 23B effectively connected downstream with respect to the valve opening 59 of the outflow controlling float valve means 51 carried in the second chamber means 23A is provided with a fitting 88 similar to the left fitting 88a described above and shown in detail in FIG. 4 except for the fact that it has no end opening and does not receive a conduit or duct end such as that shown at 86 in FIG. 4, but instead has the right end of said fitting 88 closed. Otherwise, it is identical to the structure shown in FIG. 4 of the left fitting 88a and, therefore, will not again be described and illustrated.

It should be noted that the structure of the exemplary type of aspiration means best shown in FIG. 5 is particularly advantageous for a very important reason in addition to the above-mentioned very precise and accurate and controllably adjustable control of the ratio of the mixture of the chlorine-containing concentrate liquid 26 with respect to the pressurized flowing water supplied from the input pipe 31. This additional advantage lies in the fact that there is virtually no tendency for the aspiration means 22, or the other substantially identical one 21', to "salt up" or to have deposition from the chlorine-containing concentrate liquid 26 of any of the salts or other constituents in solution or in suspension therein. Such deposition of material at points of flow restriction, such as rigid valve structures, have caused many prior art structures employed under similar circumstances to have a progressive deposition of such material at such points of restriction which has had the undesirable effect of altering the flow therethrough even though no such alteration was desired and ultimately has had the result of completely shutting off the flow of liquid at such points of material deposition and build up. This is not at all true of applicant's novel exemplary form of aspiration means shown at 22 in FIG. 5 because there is no rigid point of very great flow restriction in the flow path of the chlorine-containing concentrate liquid 26. The restricted area Venturi passage 71 provides its control of flow and its back friction primarily by reason of the substantial length thereof, which is controllably adjustable, and this minimizes the necessity for reducing the effective cross section thereof to extremely small values which would tend to produce such deposition. Furthermore, it should be noted that the nozzle 68 is completely flexible, and this allows pulsations produced as a result of flow through the aspiration means 22 to effectively prevent any such deposition or to break loose any very small beginning deposition which might conceivably occur under the most severe and flow-restrictive conditions of use with a chlorine-containing concentrate 26 having excessively large quantities of such depositable material therein.

Even under such conditions of use, the flexible nature of the nozzle 68 and the relatively large cross-sectional area of the Venturi passage 71 prevents such deposition from occurring and building up in an undesirable manner which would alter the accuracy and effective adjustment of the aspiration means 22 and would ultimately lead to its failure.

Such undesirable deposition does not occur in the novel aspiration means illustrated at 22 in FIG. 5 for the reasons noted above, and additionally it should be noted that the very fine and accurate flow ratio-controlling adjustment made possible by the ratio-controlling means 62 makes it possible to open the controllably adjustable metering valve means 78 (or 78' in the case of aspiration means 22') to a degree greater than would normally be allowable for the same ratio of the two liquids, thereby even further minimizing any tendency for such deposition or "salting out" occurring at the point of maximum flow path area restriction of either of said valves 78 or 78', such as is clearly shown with respect to the valve 78 immediately under the abutting end 84 thereof in FIG. 7.

Thus, it can be seen that the novel arrangement of the aspiration means 22 has virtually eliminated any such tendency for material deposition or "salting out" either at any of the controllably adjustable metering valve means or at either of the aspiration means 22 or 22'. This is further enhanced by reason of the relative longitudinal movement of the nozzle 68.

Furthermore, it should be noted that the aspiration means 22 and 22' need not be arranged with a main flow passage 64 of a non-flexible type as is illustrated in FIG. 5, but said main flow passage 64 may actually be in the form of a flexible outer tube comprising a forward extension of the conduit 21B positioned immediately around the nozzle 68 in precisely the relationship of both said main flow passage 64 and said first inflow conduit portion 21B of FIG. 5 which is shown as comprising a flexible plastic tube in FIG. 5, which is designated by the same reference numeral 21B. Of course, this will require that the first inflow conduit portion 21B have an opening to allow the nozzle 68 to be sealingly inserted thereinto in a manner functionally equivalent to the showing of FIG. 5. However, such a modified arrangement would have both the inner nozzle 68 and the other main flow passage means 64 of a flexible pipe which would further act to enhance the effect of flow pulsations and the deposition minimization effect thereof, as referred to hereinbefore.

Incidentally, it should be noted that there is one slight difference between the aspiration means 22 and the aspiration means 22' since the aspiration means 22' has its outlet end 36' connected to the additional common output conduit portion 23B' as is clearly shown in FIG. 3. Therefore, this would require a modification of the right end of the block 63' shown in FIG. 3 from that of the block 63 of FIG. 5 to provide for coupling attachment of a nipple or other fitting means carried by the left end of the common output conduit means portion 23B' of FIG. 3 with respect to the right end of the block 63' of FIG. 3 so as to be in interior communication with the main flow passage thereof, corresponding to that shown at 64 in FIG. 5 of the first-mentioned aspiration means 22.

Figure 8:
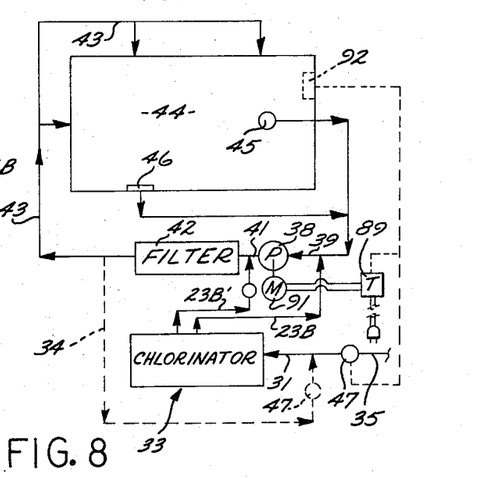
FIG. 8 is a schematic view illustrating the hydraulic circuitry of one exemplary system embodying the chlorinating apparatus of the present invention connected in circuit with a large quantity of swimming pool water and a small quantity of additional make-up water for effectively chlorinating same in a desired optimum manner. This view illustrates certain slight variations or optional modifications of the primary circuitry in broken lines in FIG. 8.
Figure 9:
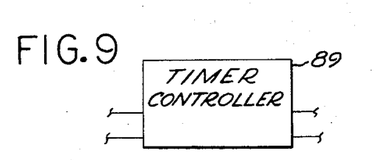
FIG. 9 is a fragmentary block diagrammatic view illustrating a timer or clock type controller such as may be used for controlling the input valve to the chlorinator of FIG. 8 and/or such as may be used for controlling energization of the motor driving the main swimming pool water circulating pump as shown in FIG. 8.

FIG. 9 merely illustrates an arrangement where a timer or clock type of controller, such as is shown in broken lines at 89 in FIG. 8 and in solid lines at 89 in FIG. 9, may be coupled with respect to the main input valve 47 (which may be solenoid operated), which is connected to the main input pipe 31 to the chlorinator 33 for intermittently opening said valve 47 for supplying input water flow at any desired time intervals and for any desired length of time at each such interval as determined by the requirements for maintaining a proper water level in the swimming pool. It should also be noted that the timer 89 may, if desired, be electrically coupled with respect to the pump-driving motor 91 for correspondingly intermittently energizing same and intermittently driving the main swimming pool water recirculating pump 38. Or these two features may be divorced from each other.

Figure 10:
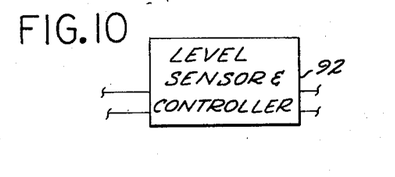
FIG. 10 is a fragmentary block diagrammatic view illustrating a main swimming pool water level sensor and controller such as may be used for controlling the input valve to the chlorinator of FIG. 8 (of course, in lieu of the timer ir clock type controller shown in FIG. 9) and/or such as may be used for controlling energization of the motor driving the main swimming pool water circulating pump as shown in FIG. 8 (also, in lieu of the timer or clock type controller shown in FIG. 9).

FIG. 10 illustrates a further alternate arrangement wherein a main swimming pool water level sensor and controller, such as is indicated in broken lines at 92 in FIG. 8 and in solid lines at 92 in FIG. 10, may be effectively connected (usually electrically) with respect to the main input valve 47 to the chlorinator 33 for controlling same in a manner such as to feed make-up or input water to the chlorinator 33 and ultimately into the main swimming pool water supply only when its level falls to or below a predetermined minimum height and also arranged so as to cause said main input valve 47 to be closed when the main swimming pool water rises to a predetermined maximum height.

In the exemplary form of the invention illustrated, said first and second chamber means 21A and 23A are all carried within and defined by a common housing means generally designated at 93 which is of a readily assembleable and disassembleable multiple sliding plastic panel construction to facilitate the installation and use thereof.

It should be clearly noted that, in certain forms of the invention, the first inflow means, such as designated at 21, and/or the common outflow means, such as is designated at 23, may be somewhat modified and, in certain forms, may eliminate either the first or second chamber means 21A and/or 23A and may make direct connections with respect to the corresponding aspiration means.

The entire chlorinator, in the exemplary form illustrated, is preferably made of non-corrodible materials such as plastic or the like, although various other suitable materials may be employed in lieu thereof.

Figure 1:
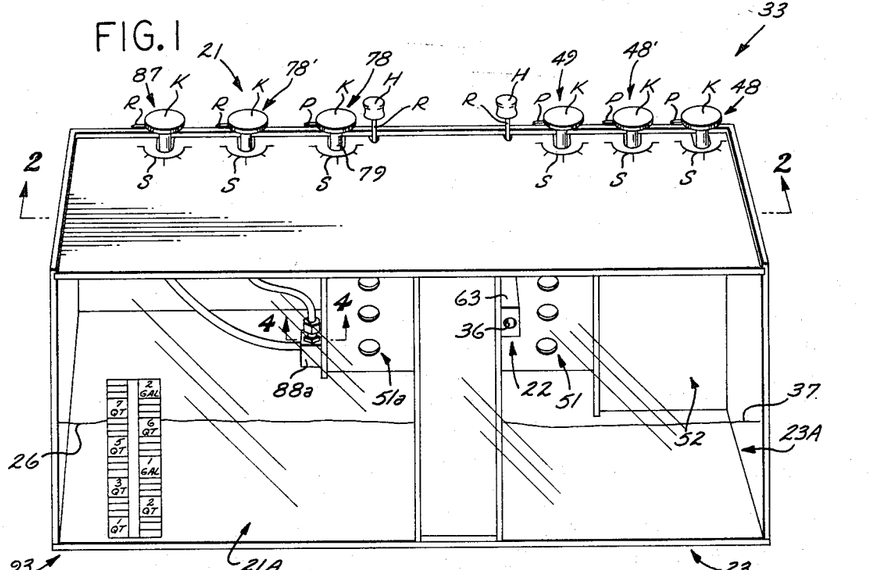

It should be noted that each of the controllably adjustable metering valves, such as the exemplary one illustrated in detail at 78 in FIG. 7, was be provided with an upper operating knob for convenient use in manually rotating same and with scale and index or pointer means to provide for very accurate setting of each such controllably adjustable metering valve means. All such operating knobs are designated in FIGS. 1 and 2 by the letter K, all such scale means in said FIGS. 1 and 2 are designated by the letter S, and all such index or pointer means in said FIGS. 1 and 2 are designated by the letter P. Also, it should be noted that each of the two outflow controlling float valves 51 and 51a are provided with upper connecting rods and operating handles at the upper ends thereof for the purpose of making it possible to manually control same when desired. Each of said two connecting rods is designated in the figures by the letter R, and each of said two operating handles is designated in the figures by the letter H.

It should be noted that all of the elements which are primed in FIG. 3 may be said to comprise a pressure system or circuit since said elements are adapted to be connected from the output of the chlorinator 33 to the pressure or outlet side 41 of the pump 38, as is best shown in FIG. 8, as opposed to the other outlet 23B from the chlorinator 33 which may be said to comprise a suction system or circuit adapted to be connected to the low pressure suction or inlet side 39 of the pump 38. It should be noted that said pressure and suction systems or circuits may be used alternately, in conjunction, or in certain forms of the invention either one may be eliminated entirely from the apparatus, if desired.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Liquid additive apparatus of an aspirating and mixing type for aspirating and adding a first liquid to a pressurized flowing second liquid in a desired ratio, comprising: first inflow means adapted to be supplied with an additive first liquid which is to be added to a pressurized flowing second liquid; second inflow means adapted to be supplied with said pressurized flowing second liquid; and aspiration means effectively connected in circuit with said first and second inflow means, and having common outflow means connected thereto, said aspiration means including a main flow passage in series with said second inflow means for passing said pressurized flowing second liquid therethrough to said common outflow means, said aspiration means including an effective Venturi means in said main flow passage means communicating with said first inflow means for applying aspirating suction to said first inflow means for aspirating said first liquid into said pressurized flowing second liquid in said main flow passage in a desired ratio and for subsequently mixing same, said Venturi means comprising an effective outer annular flow passage for said additive first liquid in circuit with said first inflow means and an inner reduced-diameter flexible tubular nozzle member for said pressurized flowing second liquid in circuit with said second inflow means, with both said outer annular flow passage and said reduced-diameter flexible tubular nozzle member being similarly directed in a substantially concentric manner over substantial portions of the lengths thereof for directing flow of said additive first liquid in said outer annular flow passage and flow of said pressurized flowing second liquid along the interior of said reduced-diameter flexible tubular nozzle member in the same direction, said effective outer annular flow passage being of effectively reduced cross-sectional flow path area as compared with corresponding upstream and downstream effective cross-sectional flow path areas, the hollow interior of said main flow passage downstream of an end of said reduced-diameter flexible nozzle member being unconstricted and continuously substantially larger in diameter than said reduced-diameter flexible nozzle member along the entire length thereof; and ratio-controlling means for controlling the ratio of said first liquid aspirated from said first inflow means through said outer annular flow passage into said main flow passage of said aspiration means for controlling the ratio of said first additive liquid added to and mixed with said pressurized flowing second liquid, said ratio-controlling means comprising means for controllably adjusting and varying the length of said effectively reduced cross-sectional flow path area of said outer annular flow passage for said additive first liquid by correspondingly longitudinally relatively moving said reduced-diameter flexible tubular nozzle member concentrically with respect to said main flow passage, thus correspondingly modifying the back friction or flow impedance effective in controlling the flow of said additive first liquid into the freely flowing pressurized second liquid flowing through said main flow passage, said ratio-controlling means further comprising controllably adjustable metering valve means effectively connected in circuit with said first inflow means upstream from said aspiration means and another controllably adjustable metering valve means effectively connected in circuit with said second inflow means upstream from said aspiration means, each of said metering valve means including a flexible tube supported on an immovable base and provided in opposition therewith with a controllably advanceable and retractable abutting member for forcibly controllably collapsing the flexible tube and correspondingly closing the hollow interior thereof to any desired degree.

2. Apparatus as defined in claim 1, wherein said first inflow means includes a chamber means connected in circuit therewith between an input portion of said first inflow means and said aspiration means and adapted to contain a quantity of said additive first liquid which is to be added to said pressurized flowing second liquid.

3. Apparatus as defined in claim 1, wherein said first inflow means includes a chamber means connected in circuit therewith between an input portion of said first inflow means and said aspiration means and adapted to contain a quantity of said additive first liquid which is to be added to said pressurized flowing second liquid, said chamber means being provided with outflow-controlling float valve means operable for effective closure of said first inflow means between said chamber means and said aspiration means in response to outflow of said additive first liquid from said chamber means to a predetermined lower minimum level of the top surface thereof, and effectively operable for opening said float valve means in response to the rising of the top surface level of said additive first liquid in said chamber means above said predetermined lower minimum level thereof.

4. Apparatus as defined in claim 1, wherein said common outflow means includes a chamber means connected in circuit therewith between said aspiration means and an output portion of said common outflow means.

5. Apparatus as defined in claim 1, wherein said common outflow means includes a chamber means connected in circuit therewith between said aspiration means and an output portion of said common outflow means, said chamber means being provided with outflow-controlling float valve means operable for the effective closure of said common outflow means connected to said chamber means in response to outflow of the mixed first and second liquids from said chamber means to a predetermined lower minimum top surface level thereof, and operable for the effective opening of said float valve means in response to the rising of the top surface level of said mixed first and second liquids in said chamber means above said predetermined lower minimum level thereof.

6. Apparatus as defined in claim 1, wherein said common outflow means includes a chamber means connected in circuit therewith between said aspiration means and an output portion of said common outflow means, said chamber means being provided with inflow-controlling float valve means operable for effective closure of said second inflow means upstream of said aspiration means in response to flow of said mixed first and second liquids from said aspiration means into said chamber means to a predetermined upper maximum level of the top surface thereof, and effectively operable for the opening of said float valve means in response to the dropping of said top surface level of said mixed first and second liquids in said chamber means below said predetermined upper maximum level thereof.

7. Apparatus as defined in claim 1, wherein said common outflow means includes a chamber means connected in circuit therewith between said aspiration means and an output portion of said common outflow means, said chamber means being provided with inflow-controlling float valve means operable for effective closure of said second inflow means upstream of said aspiration means in response to flow of said mixed first and second liquids from said aspiration means into said chamber means to a predetermined upper maximum level of the top surface thereof, and effectively operable for the opening of said float valve means in response to the dropping of said top surface level of said mixed first and second liquids in said chamber means below said predetermined upper maximum level thereof, said chamber means being provided with outflow-controlling float valve means operable for the effective closure of said common outflow means connected to said chamber means in response to outflow of the mixed first and second liquids from said chamber means to a predetermined lower minimum top surface level thereof, and operable for the effective opening of said outflow-controlling float valve means in response to the rising of the top surface level of said mixed first and second liquids in said chamber means above said predetermined lower minimum level thereof.

8. Apparatus as defined in claim 1, wherein said first inflow means includes a first chamber means connected in circuit therewith between an input portion of said first inflow means and said aspiration means and adapted to contain a quantity of said additive first liquid which is to be added to said pressurized flowing second liquid, said common outflow means including a second chamber means connected in circuit therewith between said aspiration means and an output portion of said common outflow means.

9. Apparatus as defined in claim 8, including housing means effectively carrying and defining said first and second chamber means therein.

10. Apparatus as defined in claim 9, wherein said second chamber means is provided with inflow-controlling float valve means operable for effective closure of said second inflow means upstream of said aspiration means in response to inflow of said mixed first and second liquids from said aspiration means into said second chamber means to a predetermined upper maximum level of the top surface thereof, and effectively operable for the opening of said float valve means in response to the dropping of said top surface level of said mixed first and second liquids in said second chamber means below said predetermined upper maximum level thereof.

11. Apparatus as defined in claim 1, wherein said first inflow means includes a first chamber means connected in circuit therewith between an input portion of said first inflow means and said aspiration means and adapted to contain a quantity of said additive first liquid which is to be added to said pressurized flowing second liquid, said common outflow means including a second chamber means connected in circuit therewith between said aspiration means and an output portion of said common outflow means, said first chamber means being provided with outflow-controlling float valve means operable for effective closure of said first inflow means between said first chamber means and said aspiration means in response to outflow of said additive first liquid from said first chamber means to a predetermined lower minimum level of the top surface thereof, and effectively operable for opening said float valve means in response to the rising of the top surface level of said additive first liquid in said first chamber means above said predetermined lower minimum level thereof, said second chamber means being provided with outflow-controlling float valve means operable for the effective closure of said common outflow means connected to said second chamber means in response to outflow of the mixed first and second liquids from said second chamber means to a predetermined lower minimum top surface level thereof, and operable for the effective opening of said float valve means in said second chamber means. In response to the rising of the top surface level of said mixed first and second liquids in said second chamber means above said predetermined lower minimum level thereof.

12. Apparatus as defined in claim 1, wherein said apparatus comprises chlorinating apparatus for adding said first liquid, comprising a chlorine-containing liquid, to said pressurized flowing second liquid, comprising pressurized water for a swimming pool, in a controllably adjustable desired ratio and for effectively mixing same together.

13. Apparatus as defined in claim 1, wherein said means for controllably adjusting the variable length of said reduced cross-sectional flow path area of said outer annular flow passage comprises manually operable actuator means including a manually rotatable toothed gear provided with and cooperating with a longitudinally toothed slidably mounted rack member coupled to said reduced-diameter flexible nozzle member for controllably moving said nozzle member inwardly or outwardly relative to said main flow passage.

References Cited
UNITED STATES PATENTS

| | | | |
|---|---|---|---|
| 1,936,538 | 11/1933 | Borden | 137—571 X |
| 2,789,573 | 4/1957 | Glass | 137—101.27 |
| 2,900,176 | 8/1959 | Krogel | 137—101.27 X |
| 3,049,144 | 8/1962 | Oleskow | 137—391 |

FOREIGN PATENTS 541,315  11/1941  Great Britain.

ALAN COHAN, *Primary Examiner.*

D. J. ZOBKIW, *Assistant Examiner.*